United States Patent
Koch et al.

(10) Patent No.: US 6,719,279 B1
(45) Date of Patent: Apr. 13, 2004

(54) AIR SPRING SLEEVE

(75) Inventors: Russell W. Koch, Hartville, OH (US); John D. Rensel, Tallmadge, OH (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 10/225,806

(22) Filed: Aug. 21, 2002

(51) Int. Cl.[7] .................................................. F16F 9/04
(52) U.S. Cl. .............................. 267/64.27; 267/64.24
(58) Field of Search ........................ 267/64.11, 64.19, 267/64.21, 64.23, 64.24, 64.27

(56) References Cited

U.S. PATENT DOCUMENTS

| | | |
|---|---|---|
| 3,319,952 A | 5/1967 | Travers |
| 3,700,225 A | 10/1972 | Fader et al. |
| 3,897,941 A * | 8/1975 | Hirtreiter et al. ........ 267/64.24 |
| 4,673,168 A | 6/1987 | Warmuth et al. |
| 4,741,517 A * | 5/1988 | Warmuth et al. ........ 267/64.24 |
| 4,784,376 A * | 11/1988 | Ecktman .................. 267/64.27 |
| 4,807,858 A | 2/1989 | Watanabe et al. |
| 4,832,317 A | 5/1989 | Alaphilippe |
| 4,921,226 A | 5/1990 | Pees |
| 5,201,499 A * | 4/1993 | Elliott et al. ............. 267/64.27 |
| 5,267,725 A * | 12/1993 | Wode et al. .............. 267/64.27 |
| 5,346,187 A * | 9/1994 | Drescher ................. 267/64.11 |
| 5,374,037 A | 12/1994 | Bledsoe |
| 5,566,929 A | 10/1996 | Thurow |
| 6,264,178 B1 * | 7/2001 | Schisler et al. .......... 267/64.27 |

* cited by examiner

Primary Examiner—Jack Lavinder
Assistant Examiner—Benjamin A Pezzlo
(74) Attorney, Agent, or Firm—Michael Sand; Michael R. Huber

(57) ABSTRACT

A flexible sleeve for an air spring terminates in end portions which define a pair of open ends. The sleeve has inner and outer layers of a flexible material with a plurality of reinforcement elements disposed within the materials with the reinforcement elements extending throughout the end portions. Inner and outer layers of the end portions are joined to the inner and outer layers of the sleeve, by non-overlapping joints with the inner and outer layers of the end portions having a higher modulus of elasticity than the inner and outer layers of the sleeve.

22 Claims, 5 Drawing Sheets

AIR SPRING SLEEVE

BACKGROUND OF THE INVENTION

1. Technical Field

The invention relates to air springs, and more particularly to an improved sleeve used therein. Even more particularly, the invention relates to an air spring sleeve having modified ends which reduce slippage from beneath the clamp ring without effecting the ride characteristic of the air spring.

2. Background Information

Air springs typically include two end members which are sealingly connected to respective ends of a fabric reinforced flexible bladder or sleeve. These air springs are used primarily for implementation in motor vehicles, supporting the vehicle body, or for use in other types of equipment subject to shock to provide cushioning therefor. The air spring sleeve usually has opposed open ends which are sealed to the end members by a clamp or swage ring to form a pressurized fluid chamber within the sleeve. The flexible sleeve usually consists of inner and outer layers of a non-reinforced elastomeric material with a plurality of reinforcing schemes sandwiched between these inner and outer layers or combinations therein. The modulus of the elastomeric material must be low enough to continuously flex as the air spring moves from extended to compressed positions without deteriorating to provide a durable air spring. However, the low modulus material, although satisfactory for retaining the pressurized fluid within the air chamber and for providing sufficient durability, increases the difficulty of forming an airtight seal with the end members, which is usually accomplished by a swage or clamp ring. The swage ring clamps the intervening sleeve ends against a clamping surface formed on the end member with the ring and/or the end members having various projections and grooves to enhance clamping effectiveness. The use of this low modulus material can cause slippage from beneath the swage ring or excessive wrinkling, resulting in potentially too restrictive leakage paths being created between the internal fluid chamber and surrounding atmosphere.

Prior art air spring sleeves have attempted to overcome this problem by increasing the hardness of the sleeve ends, such as shown in U.S. Pat. No. 3,319,952. However, this sleeve construction, as well as other prior art sleeve constructions having reinforced ends, increase the thickness of the sleeve ends in order to achieve the increased hardness and reduce slippage. These thickened ends can increase the manufacturing costs and can require use of different assembly machines and crimping machines than those used with elastomeric sleeves which have a uniform thickness throughout their axial lengths.

Thus it is desirable to form the flexible sleeve for an air spring having ends formed of a material with a higher modulus of elasticity than the majority of the sleeve material in order to increase the stiffness in the clamped area without materially effecting the flexibility and durability of the elastomeric sleeve. Generally, the higher the modules of elasticity, the harder the sleeve material as applied to rubber products; that is, hardness becoming the relative resistance of the surface to indentation as measured by normal means.

BRIEF SUMMARY OF THE INVENTION

One aspect of the present invention is to provide an elastomeric sleeve for use in an air spring in which the ends of the sleeve have a higher modulus, and thus stiffer material to provide a more effective sealing engagement when clamped between a swage ring and sealing surface of the end member, and which will not effect the ride characteristic of the air spring and durability thereof, by enabling the lower modulus elastomeric material to be used throughout the majority of the axial length of the sleeve.

A further feature of the invention is to provide a flexible sleeve with a uniform thickness throughout its entire axial length, thereby enabling existing air spring assembly equipment and tooling to be utilized.

The sleeve of the present invention enables the sleeve to be formed of an elastomeric material which contains one or more plies of reinforcing material to extend throughout its axial length as in prior art sleeve constructions having the same or similar elastomeric material layers extending completely through the sleeve length.

In one of the embodiments of the invention, only the inner layer of the modified end portion of the sleeve is formed of a higher modulus material, and in another embodiment, only the outer layer of the end portion is formed of the higher modulus material; and in a further embodiment, both the inner and outer layers of the modified end portions of the sleeve are formed of the higher modulus material.

In accordance with one of the main aspects of the invention, the higher modulus layers in the end portions of the sleeve are joined with the lower modulus inner and outer layers of the sleeve by a non-overlapping joint, such as a butt joint or bevel joint, so as not to effect the overall uniform constant thickness of the sleeve.

Preferably, the Shore A harness of the end portion or portions of the sleeve, which can be correlated to the modulus of elasticity, will be at least 45 to 50.

The foregoing advantages, construction and operation of the present invention will become more readily apparent from the following description and the accompanying drawings.

BRIEF DESCRIPTION OF THE DRAWINGS

Similar numerals refer to similar parts throughout the drawings.

DETAILED DESCRIPTION OF THE INVENTION

Figure 1:
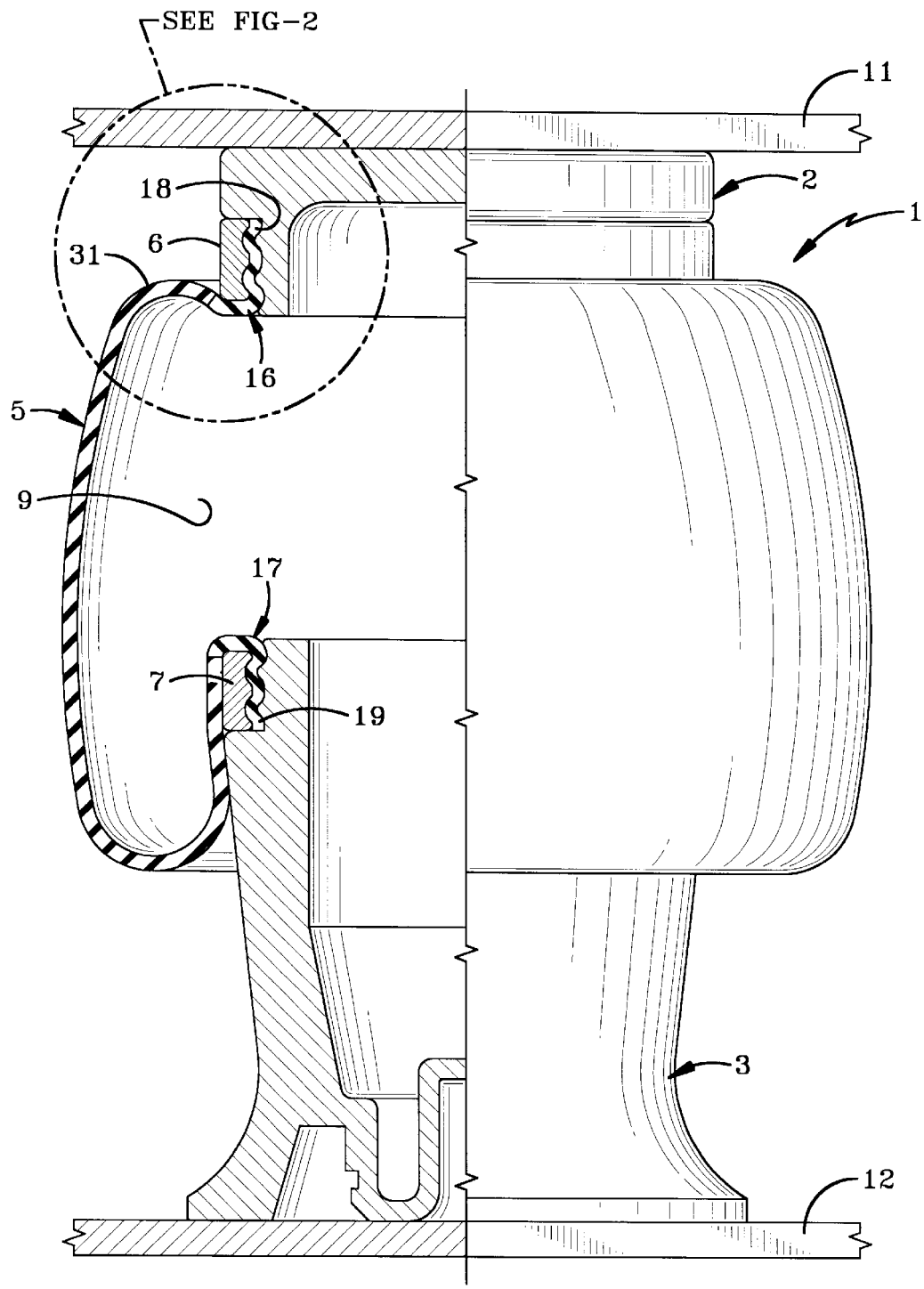
FIG. 1 is an elevational view, portions of which are broken away and in section, showing an air spring having the improved flexible sleeve and its clamping engagement with the end members of the air spring.
Figure 2:
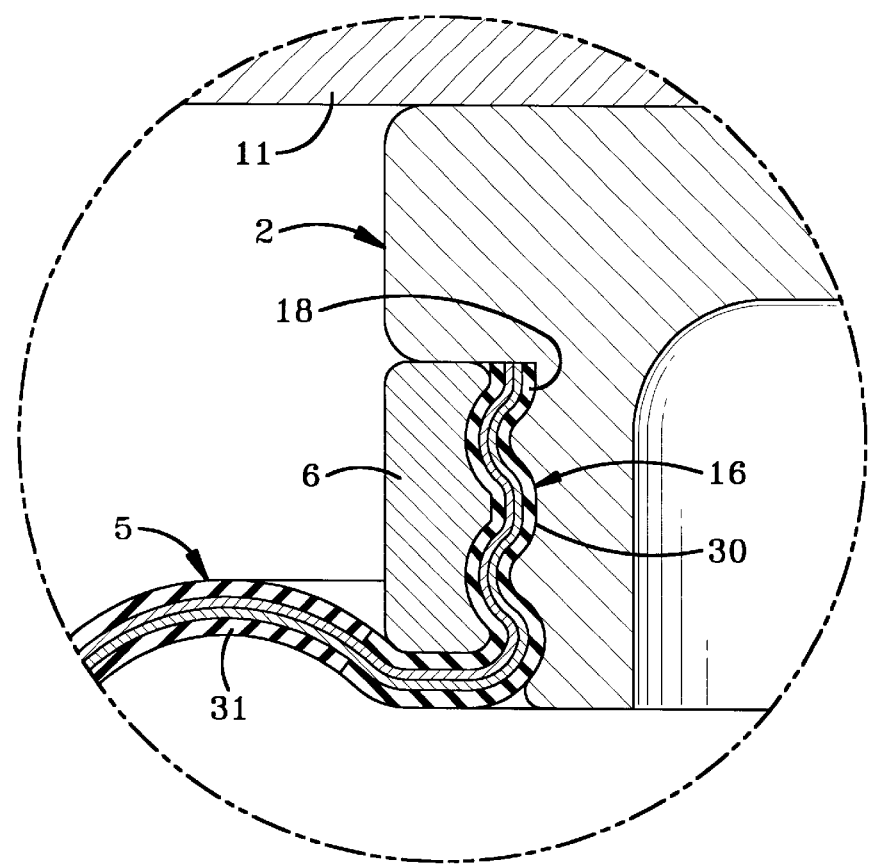
FIG. 2 is an enlarged sectional view of the encircled portion of FIG. 1.
Figure 3:
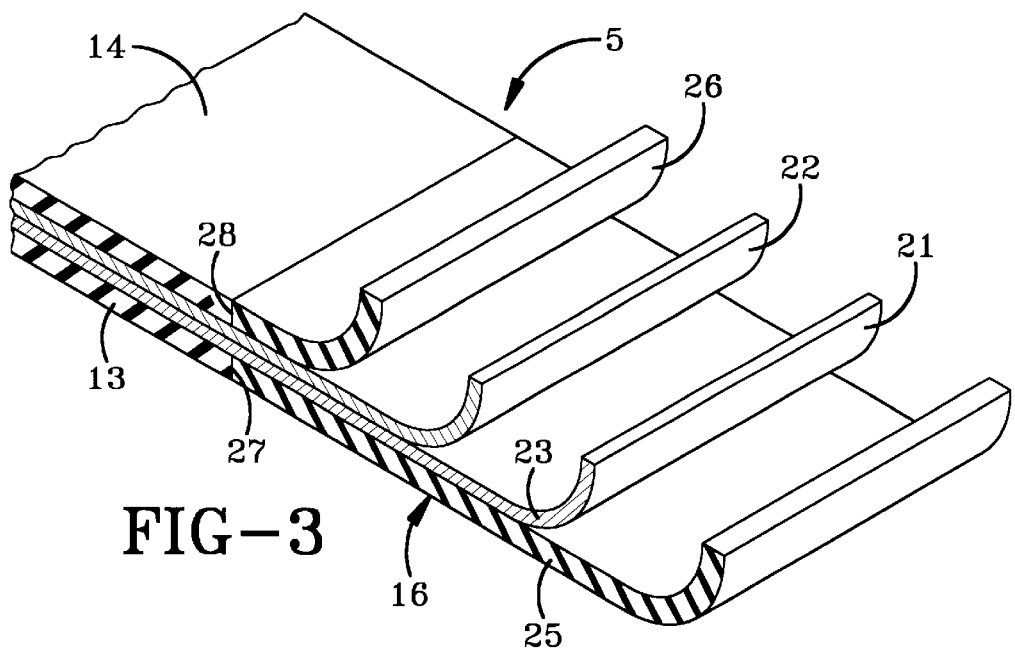
FIG. 3 is a fragmentary diagrammatic sectional view showing the construction of an end portion of the sleeve.

One embodiment of a vehicle air spring according to the present invention is shown in FIGS. 1–3 and is indicated generally at 1. As shown in FIG. 1, air spring 1 includes a top end member 2 and a bottom end member 3 which is depicted as a usual piston. The improved flexible sleeve, which is indicated generally at 5, is an elongated tubular member which extends between end members 2 and 3 and is sealingly clamped thereagainst by swage rings 6 and 7 respectively, and forms an internal fluid pressure chamber 9 therein. Sleeve 5 preferably is formed of an elastomeric sleeve consisting primarily of rubber, but can be formed of thermoplastic elastomers (TPE), thermoplastic vulcanizates (TPV), thermoplastic olinfins (TPO), and similar flexible materials without effecting the concept of the invention. End members 2 and 3 are attached to two spaced members 11 and 12 respectively, which may be parts of a motor vehicle, such as a vehicle chassis and vehicle axle, or any device where cushioning is desired between two spaced members.

As shown in FIGS. 2 and 3, sleeve 5 is formed of inner and outer layers 13 and 14 respectively, which extend generally throughout the axial length of the air sleeve, except for modified end portions 16 and 17 which form open sleeve ends 18 and 19 respectively. Inner and outer layers 13 and 14 are formed of a relatively low modulus non-reinforced material having a Shore A hardness (ASTM D2240) in the general range of 45 and 65. This hardness range provides the desired flexibility to the air spring sleeve to achieve a certain ride characteristic, and provides durability over the life of the air spring.

A pair of reinforcing plies 21 and 22 are sandwiched between inner and outer layers 13 and 14 and extend throughout the axial length of the air spring. Plies 21 and 22 are of a usual construction consisting of a plurality of reinforcing elements or cords 23 calandered within a thin layer of an elastomeric material. In usual air spring constructions, the cords will be at a bias angle and opposed to each other in the two reinforcing plies.

Figure 3A:
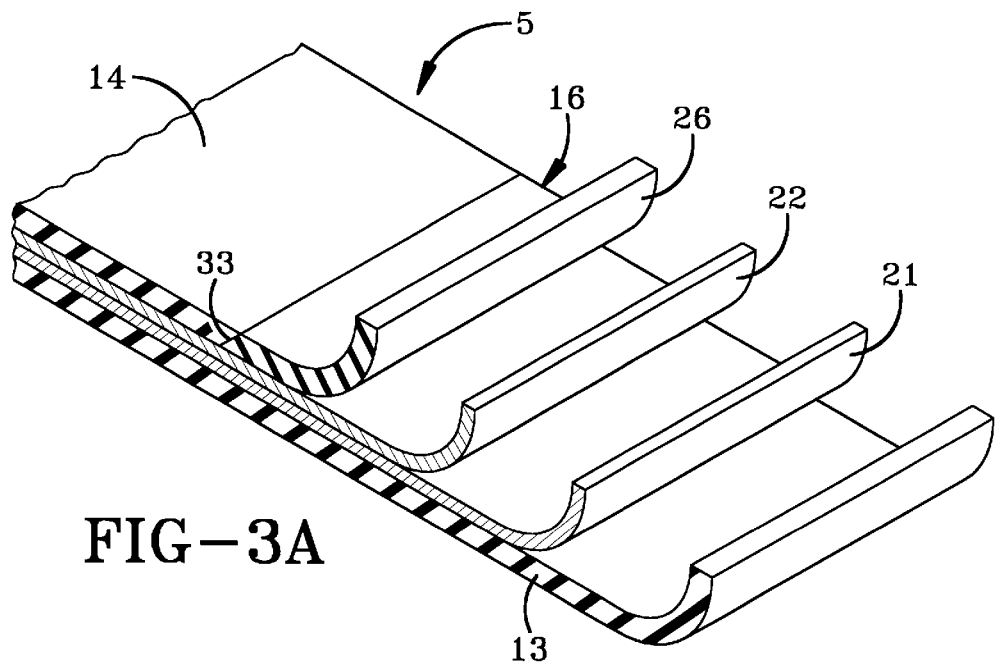
FIG. 3A is a fragmentary diagrammatic view similar to FIG. 3, showing only the outer layer of the end portion having a beveled joint with a hardened end material.
Figure 3B:
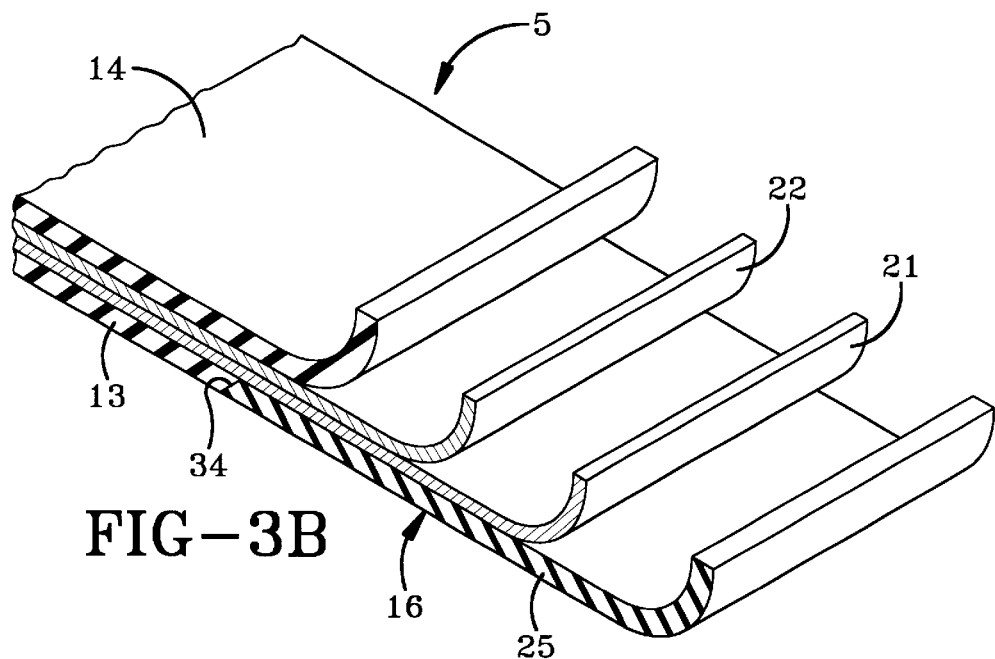
FIG. 3B is a fragmentary diagrammatic sectional view similar to FIG. 3A, showing only the inner layer forming a beveled joint with the hardened end material.

In accordance with the invention as shown particularly in FIGS. 1–3, sleeve 5 includes modified end portions 16 and 17, which preferably are similar to each other. Thus only end portion 16 is described in detail and shown in the drawings. End portion 16 includes inner and outer layers 25 and 26 respectively, which are formed of a harder or higher modulus material than that of layers 13 and 14. Layers 25 and 26 of end portion 16 form joints 27 and 28 respectively, with inner and outer layers 13 and 14 of sleeve 5, either by a butt joint as shown in FIG. 3, or a bevel joint as shown in FIGS. 3A and 3B. These types of joints prevent an increase in thickness at the junction between the inner and outer layers of the main sleeve body and the modified end portions. Other types of joints can also be used so long as they do not provide an increased thickness at the joint area.

Stiffer end portions 25 and 26 will have a Shore A hardness, between 60 and 100 with a preferred hardness range of between 60 and 80. This increased hardness and stiffness will provide for a more reliable air seal when clamped between swage ring 6 and clamping surface 30 of end member 2. End portion layers 25 and 26 will have an axial length of between 10 mm and 50 mm which will enable it to be suitably clamped by swage ring 6 and terminate before reaching an adjacent areas 31 of the air sleeve as shown in FIG. 2, which is subjected to continuous and high flex stresses where the lower modulus material is important.

Furthermore, as shown in FIGS. 2 and 3, reinforcing plies 21 and 22 extend throughout the length of the sleeve, and are sandwiched between inner and outer layers 25 and 26 of end portions 16 and 17. Again, end portions 16 and 17, together with plies 21 and 22, have the same thickness as the rest of sleeve 5.

FIG. 3A shows a slightly modified end portion 16 of the air sleeve wherein inner layer 13 of the sleeve extends completely throughout the axial length of the sleeve, including the end portion. Only outer layer 26 of end portion 16 is formed of the higher modulus material and forms joint 33 with outer layer 14 of sleeve 5. Joint 33 is illustrated as a bevel joint, but could be a butt joint as shown in FIG. 3 without effecting the concept of the invention. Again, joint 33 is a non-overlapping joint so that the thickness at the joint area is uniform and the same thickness as that of outer layers 14 and 26.

A further modification is shown in FIG. 3B wherein only inner layer 25 of end portion 16 is formed of the higher modulus material and is joined to inner layer 13 of sleeve 5 by a beveled joint 34, or butt joint if desired, with outer layer 14 continuing throughout the axial length of the elastomeric sleeve.

Again, in both the embodiments of FIGS. 3A and 3B, reinforcing plies 21 and 22 will extend throughout the length of the sleeve, including end portions 16 and 17 with the end portion layers being of the same uniform thickness as are main sleeve layers 13 and 14. This insures that the sleeve has a uniform thickness throughout its entire axial length, enabling usual installation tools and equipment to be utilized when mounting the sleeve on the end members. Furthermore, the various joints 27, 28, 33, and 34 can be achieved when the air spring sleeve is vulcanized or can be bonded by various adhesives within the spirit of the invention.

Figure 4:
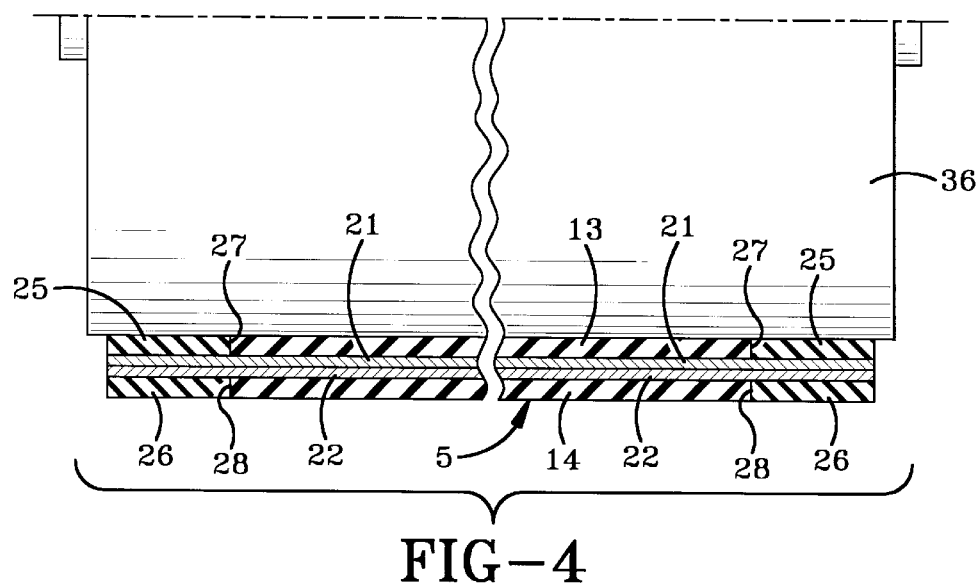
FIG. 4 is a fragmentary diagrammatic view, portions of which are in section, showing one method of manufacturing the sleeve having the higher modulus end portions.
Figure 5:
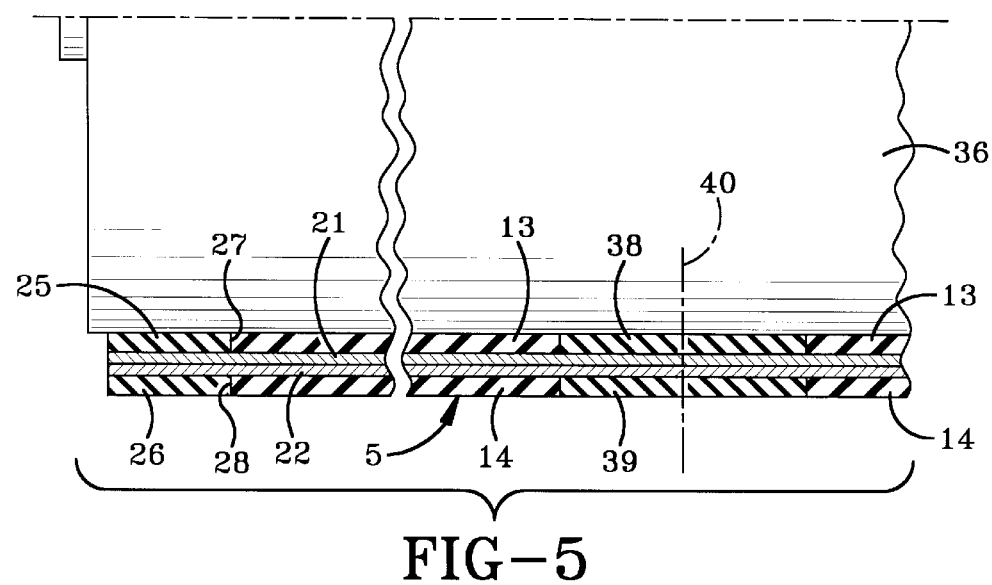
FIG. 5 is a fragmentary diagrammatic view similar to FIG. 4 showing another method for manufacturing a pair of the sleeves having higher modulus end portions.

In accordance with another advantage of the present invention, existing equipment can be utilized when forming sleeve 5 as shown by the improved lay-up method of FIGS. 4 and 5. As shown in FIG. 4, a usual sleeve building mandrel 36 is provided on which inner layer 13 is first layed up and wrapped about mandrel 36. Next, a pair of strips of material which form inner layers 25 of end portions 16 and 17 are placed about the mandrel in an abutting relationship with layer 13 for forming joints 27 or 34 therewith. Next, the two reinforcing plies 21 and 22 are layed up on mandrel 36 followed by the subsequent placement of outer layer 14 and the placement of a pair of end strips to form outer layer 26 of the higher modulus end portions. Thus the production of air sleeve 5 will require several additional manufacturing steps, namely the placement of the four additional strips of the higher modulus material, or in certain embodiments as shown in FIGS. 3A and 3B, only two additional strips on the cylindrical mandrel.

FIG. 5 shows a slightly modified method of building a pair of sleeves 5 in a single operation. The same layers 13 and 14 and strip materials 25 and 26 are layed up on mandrel 36 as discussed above and shown in FIG. 5 with the exception that a pair of higher modulus strips 38 and 39, approximately twice the length of strips 25 and 26, are placed on the mandrel between inner and outer layers 13 and 14 so that when the sleeve is removed form the mandrel, it can be slit along line 40 to form a pair of air sleeves 5 such as produced by the method shown in FIG. 4.

Figure 6:
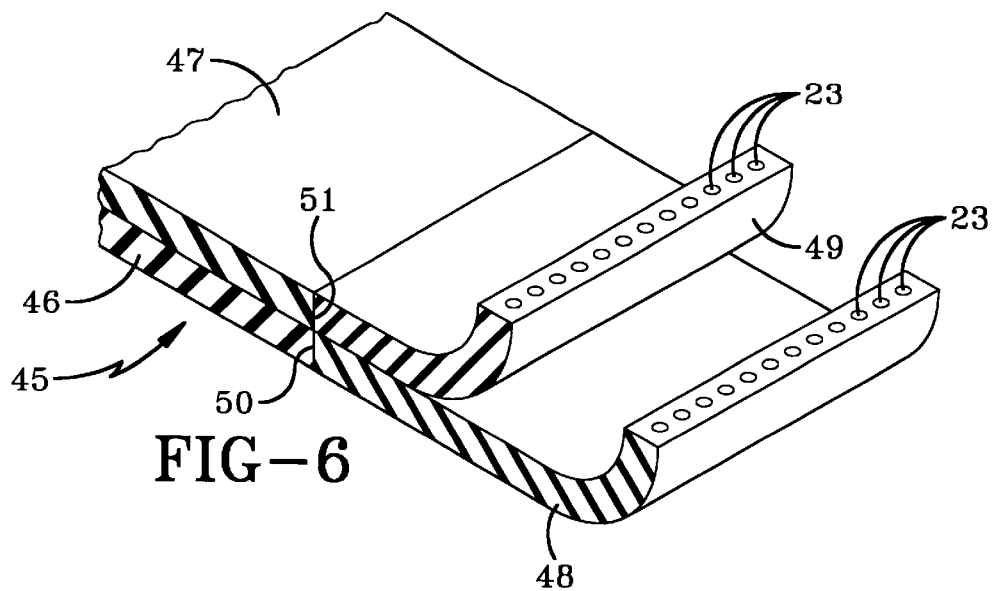
FIG. 6 is a fragmentary diagrammatic sectional view showing a modified end portion of the sleeve.
Figure 6A:
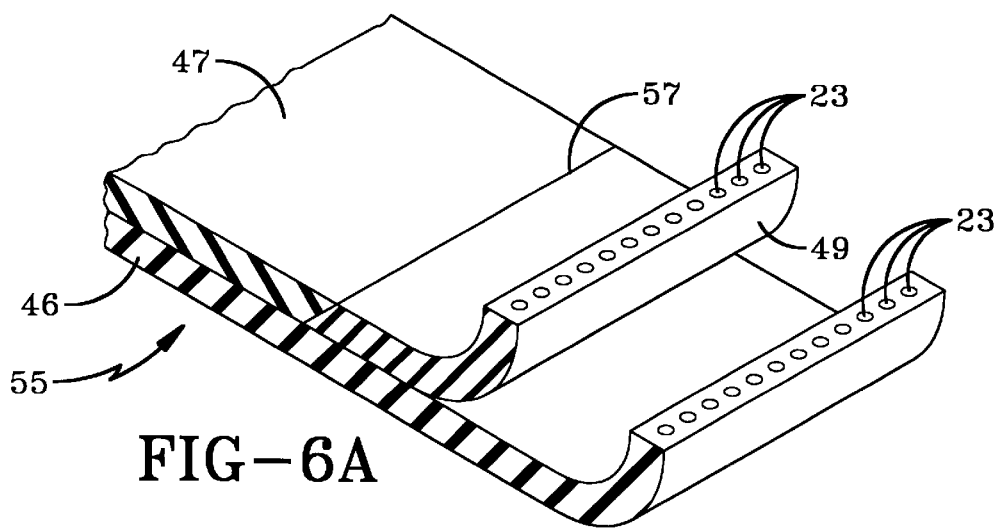
FIG. 6A is a fragmentary diagrammatic sectional view similar to FIG. 6 showing only the outer layer of the modified end portion having a beveled joint with the hardened end material.
Figure 6B:
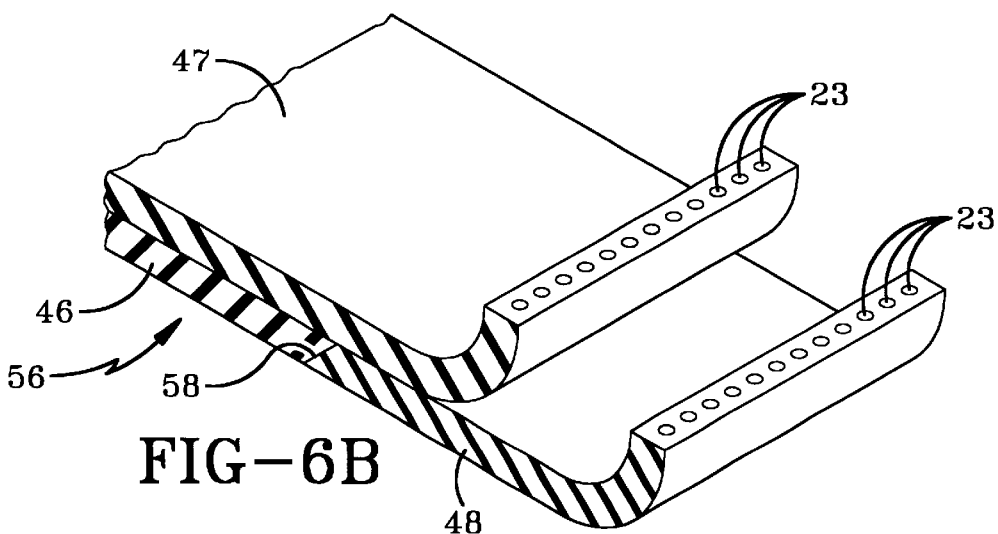
FIG. 6B is a fragmentary diagrammatic sectional view similar to FIG. 6A showing only the inner layer of the modified end portion having a beveled joint with the hardened end material.

FIGS. 6–6B show modified sleeve end constructions in which the main inner and outer layers of the sleeve have the reinforcing elements or cords embedded therein and not as separate calendered reinforcing plies. Modified sleeve 45 (FIG. 6) includes inner and outer layers 46 and 47, which terminate in stiffer end portions 48 and 49, respectively, which are joined to layers 46 and 47 by butt joints 50 and 51. Each layer has reinforcing cords 23 embedded directly therein which extend throughout the axial length of the sleeve and extend continuously through inner and outer layers 46 and 47 and stiffer end portions 48 and 49. The particular modulii of elasticity for these layers and end portions will be similar to that described above, as well as the axial lengths of the end portions.

FIGS. 6A and 6B show further modified sleeves indicated generally at 55 and 56 respectively, both of which include only a pair of elastomeric layers, which extend completely throughout the axial length of the sleeve, including the stiffer end portions, which have the reinforcing cords 23 extending throughout the axial lengths thereof. Sleeve 55 shown FIG. 6A, is similar to that of sleeve 5 shown in FIG. 3A, wherein inner layer 46 extends completely throughout the axial length of the sleeve, including the end portion, with only outer layer 47 being joined to a hardened end portion 49 by a bevel joint 57.

Modified sleeve 56 of FIG. 6B, is generally similar to that of sleeve 5 shown in FIG. 3B, wherein outer layer 47 extends completely throughout the axial length of the sleeve, with only inner layer 46 having the hardened end portion 48 secured thereto by a bevel joint 58. Again, reinforcing cords 23 extend completely throughout the axial length of layers 46 and 47 and end portion 48.

It is readily understood that bevel joints 57 and 58 of modified sleeves 55 and 56 could be butt joints or other type of non-overlapping joints than the bevel joint shown in the drawings and described above, so long as the overall thickness of the sleeve is not increased when forming the joint with the stiffer end portion. The modified ends shown in FIGS. 6–6B can be formed by various manufacturing processes, including co-extrusion in order to provide the desired modulii of elasticity for the main sleeve layers and stiffer end portions, which sleeves have only the two layers as shown in FIGS. 6–6B, containing the reinforcing cords as an integral part thereof.

Accordingly, the improved elastomeric sleeve will provide for a secure and durable potentially too restrictive seal when clamped against the adjacent end member by a swage ring or other clamping member without materially effecting the durability and flexibility of the air spring. It also enables the tooling used to assembly prior art air springs having the same modulus and constant thickness throughout to be utilized because the sleeve has a constant thickness throughout its axial length since the higher modulus end portions do not increase the thickness of the sleeve and do not form an overlapping joint when joined to the main inner and outer layers of the sleeve.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. An air spring sleeve comprising:
an elongated flexible tubular member terminating in axially spaced first and second ends and having inner and outer layers of a flexible material and containing reinforcement elements disposed therebetween and extending throughout the length of said tubular member; and at least one of said inner and outer layers of said first end terminating in a modified end portion formed of a non-reinforced elastomeric material having a higher modulus of elasticity than said one inner and outer layer of the tubular member, and being joined to said one layer by a non-overlapping joint providing said tubular member with a uniform thickness throughout its axial length.

2. The air spring sleeve defined in claim 1 wherein both of the inner and outer layers of the tubular member terminate in a modified end portion, each having at least one layer terminating in an end portion having a higher modulus of elasticity than said inner and outer layers.

3. The air spring sleeve defined in claim 1 wherein both of the inner and outer layers at both the first and second ends terminate in modified end portions wherein both layers terminate in end portions having a higher modulus of elasticity than said inner and outer layers.

4. The air spring sleeve defined in claim 1 wherein the modified end portion of said one of the inner and outer layers of the first open end has a Shore A hardness of between 60 and 100.

5. The air spring sleeve defined in claim 4 wherein the modified end portion of said one of the inner and outer layers of the first open end has a Shore A hardness of between 60 and 80.

6. The air spring sleeve defined in claim 1 wherein the inner and outer layers of the tubular member have the same thickness and hardness throughout their axial lengths.

7. The air spring sleeve defined in claim 1 wherein each of the inner and outer layers of the tubular member has a Shore A hardness in the general range of 45 and 65.

8. The air spring sleeve defined in claim 1 wherein the modified end portion has an axial length in the range of 10 mm and 50 mm.

9. The air spring sleeve defined in claim 1 wherein the non-overlapping joint formed between the said one of the inner and outer layers of the tubular member and the modified end portion is a butt joint.

10. The air spring sleeve defined in claim 1 wherein the non-overlapping joint formed between the said one of the inner and outer layers of the tubular member and the modified end portion is a bevel joint.

11. The air spring sleeve defined in claim 1 wherein the said one layer of the first end which is joined to the modified end portion having the higher modulus of elasticity is the inner layer.

12. The air spring sleeve defined in claim 1 wherein the said one layer of the first end which is joined to the modified end portion having the higher modulus of elasticity is the outer layer.

13. The air spring sleeve defined in claim 1 wherein the flexible tubular member is formed of an elastomeric material.

14. The air spring sleeve defined in claim 1 wherein the flexible tubular member is formed of a thermoplastic material.

15. The air spring sleeve defined in claim 1 wherein the flexible tubular member is formed of rubber.

16. An air spring having first and second end members and a flexible sleeve connected to said end members and forming an internal pressure chamber, said sleeve being formed with at least one open end; a ring sealingly securing said open end of the flexible sleeve to a sealing surface of the first end member; said sleeve having inner and outer layers of flexible materials and reinforcement elements disposed therein; and at least one of said inner and outer layers at the open end terminating in a modified end portion having a higher modulus of elasticity than said inner and outer layers of the sleeve and being joined to said one of the inner and outer layers by a non-overlapping joint, said modified end portion extending throughout the length of the sealing surface of said first end member.

17. The air spring defined in claim 16 wherein both of the inner and outer layers terminate in modified end portions; in which each end portion has a higher modulus of elasticity than said inner and outer layers of the sleeve and is joined to said layers by non-overlapping joints; and in which the sleeve terminates in a pair of opposed open ends.

18. The air spring defined in claim 16 wherein the modified end portion of the sleeve has a hardness in the general range of 60 to 80 on the Shore A scale.

19. The air spring defined in claim 16 wherein the inner and outer layers of the sleeve have a Shore A hardness within the general range of 45 and 65.

20. The air spring defined in claim 16 wherein the open end of the sleeve is sealingly secured to a sealing surface of the first end member by a swage ring.

21. The air spring defined in claim 16 wherein the modified end portion has a length of between 10 mm and 50 mm.

22. The air spring defined in claim 16 wherein a pair of reinforcing plies are sandwiched between the inner and outer layers of the sleeve and contain reinforcing cords.

* * * * *